(12) United States Patent
Tobita et al.

(10) Patent No.: US 7,347,955 B2
(45) Date of Patent: Mar. 25, 2008

(54) HEAT CONDUCTING POLYMER MOLD PRODUCTS

(75) Inventors: Masayuki Tobita, Isesaki (JP);
Naoyuki Shimoyama, Saitama (JP);
Tsukasa Ishigaki, Saitama (JP);
Hisashi Aoki, Tokyo (JP); Toru Kimura, Funabashi (JP); Tsunehisa Kimura, Tokyo (JP); Masafumi Yamato, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 422 days.

(21) Appl. No.: 10/686,384

(22) Filed: Oct. 14, 2003

(65) Prior Publication Data

US 2004/0087697 A1    May 6, 2004

(30) Foreign Application Priority Data

Oct. 31, 2002   (JP) .............................. 2002-318969

(51) Int. Cl.
*C09K 19/52* (2006.01)
*C09K 19/38* (2006.01)
*C09K 19/54* (2006.01)
*B32B 27/94* (2006.01)

(52) U.S. Cl. ............................. 252/299.01; 252/299.5; 428/297.4; 428/298.1; 257/E23.107

(58) Field of Classification Search ................ 428/1.1, 428/297.4, 298.1; 252/299.01, 299.5, 500; 257/E23.107; 264/450
See application file for complete search history.

(56) References Cited

U.S. PATENT DOCUMENTS 4,835,243 A    5/1989   Eckhardt et al. ............ 528/176
5,529,740 A  * 6/1996   Jester et al. ................. 264/317
2001/0025075 A1  9/2001   Smith et al. ................. 524/440

FOREIGN PATENT DOCUMENTS

| EP | 0 944 098 A2 | 9/1999 |
|---|---|---|
| EP | 1 041 627 A2 | 10/2000 |
| EP | 1 186 689 A1 | 3/2002 |
| EP | 1 265 281 A2 | 12/2002 |
| JP | 63-242513 | 10/1988 |
| JP | 03-122129 * | 5/1991 |
| JP | 04-139222 | 5/1992 |
| JP | 04-140115 | 5/1992 |
| JP | 5-271465 | 10/1993 |
| JP | 2001-523892 | 11/2001 |
| JP | 2002-086464 | 3/2002 |
| JP | 2002-088257 | 3/2002 |
| JP | 2004-043629 | 2/2004 |
| JP | 2004-050704 | 2/2004 |
| JP | 2004-051852 | 2/2004 |

OTHER PUBLICATIONS

English abstract for JP 03-122129, 1991.*

* cited by examiner

*Primary Examiner*—Shean C Wu
(74) *Attorney, Agent, or Firm*—Occhiuti Rohlicek & Tsao LLP

(57) ABSTRACT

A mold product comprising liquid crystal composition for conducting heat. The liquid crystal composition contains liquid crystal polymer having an orientation degree α obtained by equation 1 below:

Orientation degree α=(180−Δβ)/180     equation 1

In equation 1, Δβ is a half width in the intensity distribution obtained by fixing peak scattering angle in X-ray diffraction measurement and by varying the azimuth angle from 0 to 360 degrees, and orientation degree α is in a range between 0.5 and 1.0.

12 Claims, 4 Drawing Sheets

HEAT CONDUCTING POLYMER MOLD PRODUCTS

BACKGROUND OF THE INVENTION

The present invention relates to heat conducting polymer mold products, which conduct heat generated by electronic appliances, etc. In particular, the present invention relates to heat conducting polymer mold products that can realize a superior heat conducting property.

Recently high density packaging of semiconductor packages and high integration and high speed of LSI that are stored inside the electronic appliances are required in accordance with high performance, reduced size, and lightweight of electronic appliances. Measures for efficiently dissipating heat from the electronic components to the outside became very important because heat generated in various electronic components is increasing with the above described trends. As a heat dissipating member, heat conducting mold products comprising heat dissipating materials such as metal, ceramics, polymer compositions etc., are used for printed-wiring assemblies, semiconductor packages, casings, heat pipes, heat dissipating plates, and heat diffusion plates, etc.

Among the above heat dissipating members, heat conducting mold products comprising polymer compositions (hereinafter referred to as "heat conducting polymer mold products") are widely used because they are easily molded in any shapes and they are relatively light in weight.

Known polymer compositions for forming heat conducting polymer molds include compositions in which one or more heat conducting filler(s) with high heat conductivity are blended in matrix polymer material comprising for example resin or rubber. Metal oxides such as aluminum oxide, magnesium oxide, zinc oxide, quartz, etc.; metal nitrides such as boron nitride, aluminum nitride, etc.; metal carbides such as silicon carbide: metal hydroxides such as aluminum hydroxide; metals such as gold, silver, copper, etc.; carbon fibers; and graphite are used as the heat conducting fillers.

On the other hand, polymer compositions containing thermotropic liquid crystal polymer are used as matrix resin in the applications where deformation of the mold products due to high temperatures should not occur during packaging process or during its use. A thermotropic liquid crystal polymer has good workability and has superior heat resistance. An electric insulative composition having good heat conductivity, which comprises 50-90 wt. % zircon and 50-10 wt. % thermotropic liquid crystal polymer, is disclosed in Japanese Laid-Open Patent Publication 5-271465. Further, a composition comprising 20-80 wt. % heat conductive filler such as carbon fiber and 80-20 wt. % thermotropic liquid crystal polymer is disclosed in Japanese PCT National Phase Publication 2001-523892.

The physical properties of the liquid crystal polymer depend on three dimensional structure and orientation degree of the molecular chains included in the liquid crystal. The polymer chains are arranged in a crystal structure specific to each of the polymers partly in the liquid crystal. As a method to observe the arrangement of the polymer chains, X-ray diffraction is used.

However, heat conductivity is insufficient in the heat conducting polymer mold products obtained by the above described conventional art because amount of heat released from the electronic components is increasing due to its high performance.

The present invention is provided in view of the problems that were inherent in the conventional art. An object of the invention is to provide heat conducting polymer mold products that realize superior heat conductivity.

BRIEF SUMMARY OF THE INVENTION

In view of the above, the present invention provides a mold product comprising liquid crystal composition for conducting heat, the liquid crystal composition containing liquid crystal polymer having an orientation degree $\alpha$ obtained by equation 1 below:

Orientation degree $\alpha=(180-\Delta\beta)/180$      equation 1 wherein $\Delta\beta$ is a half width in the intensity distribution obtained by fixing a peak scattering angle in X-ray diffraction measurement and by varying azimuth angle from 0 to 360 degrees, and wherein $\alpha$ is in a range between 0.5 and 1.0.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
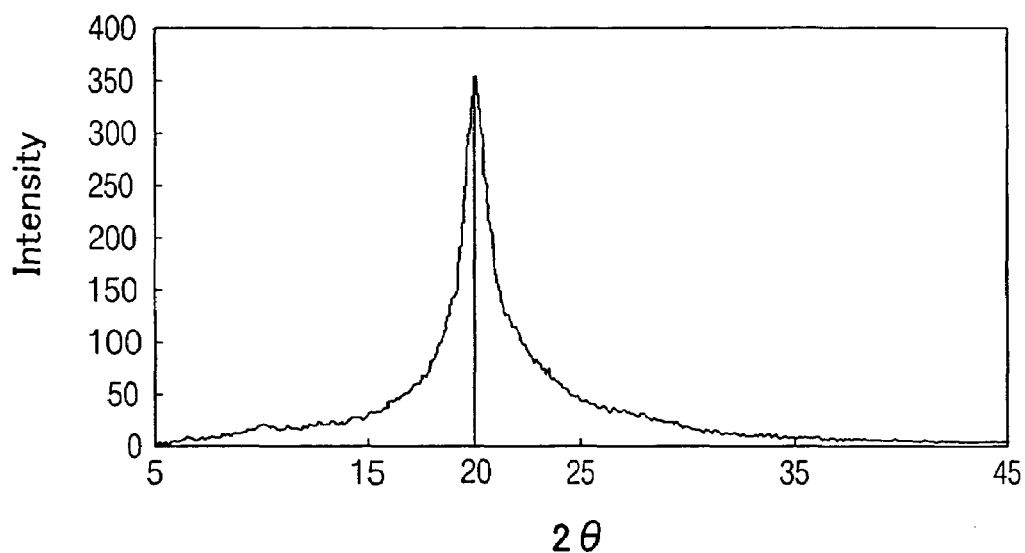
FIG. 1 is a graph showing the intensity distribution in the equatorward direction of heat conducting polymer mold product of Example 3.

An embodiment of the invention is described in detail below.

The heat conducting polymer mold of this embodiment is obtained from liquid crystal composition containing liquid crystal polymer. The states of crystallization and arrangement of the crystals can be measured by transmitting X-ray through a substance and by detecting the diffraction of the X-ray. An orientation degree $\alpha$ of liquid crystal polymer in this heat conducting polymer mold product is in a range between 0.5 and 1.0. The orientation degree $\alpha$ is a value obtained from the equation (1) below from wide-angle X-ray diffraction measurement.

Orientation degree $\alpha=(180-\Delta\beta)/180$      (1)

wherein Δβ represents a half width in the intensity distribution in 0 to 360 degrees azimuth by fixing the peak scattering angle obtained from X-ray diffraction measurement.

The heat conducting polymer mold product can be applied to heat releasing members in the print-wiring substrate assemblies or semiconductor package, such as casing, heat pipe, heat dissipating plate, heat scattering plate, etc. The heat conducting polymer mold product can conduct the heat generated in various electronic components and release the heat to the outside of the electronic appliances.

The liquid crystal composition is described in more detail below. Liquid crystal polymer contained in the liquid crystal composition exhibits molten phase having optical anisotropic property by regularly arranging the molecular chains of the polymers within the liquid crystal phase. The optical anisotropic property can be proved by any general polarization detection that uses orthogonal polarizer. Examples of the liquid crystal polymer are thermotropic liquid crystal polymer and lyotropic liquid crystal polymer.

The thermotropic liquid crystal polymer is a thermoplastic polymer that changes into liquid crystal state when heat-melted to a specific temperature range. The thermotropic liquid crystal polymer has a long and flat shape and comprises polymers which have a rigid molecular chain along the long-chain of the molecule. A plurality of molecular chains, which are placed coaxially or in parallel, have chain elongation bonds.

On the other hand, a lyotropic liquid crystal polymer is a liquid crystal polymer that exhibits liquid crystal state that has optical anisotropic property when dissolved in a solvent to a certain concentration range.

The preferably used above described liquid crystal polymer is thermotropic liquid crystal polymer. The liquid crystal state can be obtained by heat without using any solvent when the thermotropic liquid crystal polymer is used for the heat conducting composition. Accordingly the liquid crystal polymers are readily oriented.

The examples of the thermotropic liquid crystal polymers are thermotropic liquid crystal polyester, thermotropic liquid crystal polyesteramide, thermoplastic liquid crystal polyesterether, and thermotropic liquid crystal polyester carbonate, thermotropic liquid crystal polyesterimide. The thermotropic liquid crystal polymers can be grouped into main-chain thermotropic liquid crystal polymers, side-chain thermotropic liquid crystal polymers, and combined-type thermotropic liquid crystal polymer. The main-chain thermotropic liquid crystal polymer has a mesogenic group in the main-chain, which causes the polymers to exhibit liquid crystal structure. Examples of these are polyester copolymer (copolymer of polyethylene terephthalate and hydroxybenzoic acid) and a copolymer of hydroxynaphtoic acid and hydroxybenzoic acid. The side-chain thermotropic liquid crystal polymer has a mesogenic group in its side chain, and the examples are molecules that include a repeating unit which has ethylene based or siloxane based main chain and the mesogenic group is connected as a side chain to the main chain. The combined-type thermotropic liquid crystal polymer has mesogenic groups both in the main chain and in the side chain.

An example of the thermotropic liquid crystal is a thermotropic liquid crystal of full aromatic polyester. In general, a segment portion that forms optical anisotropic melted phase is formed from an ester of aromatic carboxylic acid and aromatic alcohol in the thermotropic liquid crystal full aromatic polyester. The segment portion that does not form optical anisotropic melt phase of the thermotropic liquid crystal full aromatic polyester in the embodiment can be comprised of ester of alcohol and aliphatic or alicyclic acid. The thermotropic liquid crystal full aromatic polyester of the embodiment can be formed with a segment portion that forms the optical anisotropic melt phase and that comprises ester of alcohol and aliphatic or alicyclic acid and another segment portion that does not form the optical anisotropic melt phase and that comprises ester of aromatic carboxylic acid and aromatic alcohol. Further, the segment portion that does not form the optical anisotropic melt phase can be comprised of an ester of aromatic alcohol and aliphatic or alicyclic acid or an ester of aromatic carboxylic acid and aliphatic or alicyclic alcohol.

The examples of the compositions of the thermotropic full aromatic polyester are: (a) at least one of aromatic dicarboxylic acid compounds and alicyclic dicarboxylic acid compounds; (b) at least one of aromatic hydroxycarboxylic acid compounds; (c) at least one of aromatic diol compounds, alicyclic diol compounds, and alicyclic diol compounds; (d) at least one of aromatic dithiol compounds, aromatic thiophenol compounds, and aromatic thiol carboxylic acid compounds; and (e) at least one of aromatic hydroxylamine compounds and aromatic diamine compounds. These components (a)-(e) can be solely used, but they are preferably used in combination, for example combinations (a) and (c); (a) and (d); combinations (a), (b), and (c); and (a), (b), and (e); and combination (a), (b), (c), and (e).

Aromatic dicarboxylic acid and its derivatives can be used as the aromatic dicarboxylic acid compounds (a). The aromatic dicarboxylic acid can include terephthalic acid, 4,4'-diphenyldicarboxylic acid, 4,4'-triphenyldicarboxylic acid, 2,6-naphthalenedicarboxylic acid, 1,4-naphthalenedicarboxylic acid, 2,7-naphthalenedicarboxylic acid, diphenylether-4,4'-dicarboxylic acid, diphenoxyethane-4,4'-dicarboxylic acid, diphenoxybutane-4,4'-dicarboxylic acid, diphenylethane-4,4'-dicarboxylic acid, isophthalic acid, diphenylether-3,3'-dicarboxylic acid, diphenoxyethane-3,3'-dicarboxylic acid, diphenylethane-3,3'-dicarboxylic acid, and 1,6-naphthalenedicarboxylic acid. The aromatic dicarboxylic acid derivatives have substituents such as alkyl, alkoxy, and halogen in aromatic dicarboxylic acid; more particularly chloroterephthalic acid, dichloroterephthalic acid, bromoterephthalic acid, methylterephthalic acid, dimethylterephthalic acid, ethylterephthalic acid, methoxyterephthalic acid, and ethoxyterephthalic acid.

Alicyclic dicarboxylic acid and its derivatives can be used as the alicyclic dicarboxylic acid compounds (a). The alicyclic dicarboxylic acid can include trans-1,4-cyclohexanedicarboxylic acid, cis-1,4-cyclohexanedicarboxylic acid, and 1,3-cyclohexanedicarboxylic acid. The alicyclid dicarboxylic acid derivatives have substituents such as alkyl, alkoxy, and halogen in the alicyclic dicarboxylic acid. These can include trans-1,4-(2-methyl)cyclohexanedicarboxylic acid and trans-1,4-(2-chloro)cyclohexanedicarboxylic acid.

Aromatic hydroxycarboxylic acid and its derivatives can be used as the aromatic hydroxycarboxylic acid compounds (b). The aromatic hydroxycarboxylic acid can include 4-hydroxybenzoic acid, 3-hydroxybenzoic acid, 6-hydroxy-2-naphthoic acid, and 6-hydroxy-1-naphthoic acid. The aromatic hydroxycarboxylic acid derivatives have substituents such as alkyl, alkoxy, and halogen in the aromatic hydroxycarboxylic acid, and can include 3-methyl-4-hydroxybenzoic acid, 3,5-dimethyl-4-hydroxybenzoic acid, 2,6-dimethyl-4-hydroxybenzoic acid, 3-methoxy-4-hydroxybenzoic acid, 3,5-dimethoxy-4-hydroxybenzoic acid, 6-hydroxy-5-methyl-2-naphthoic acid, 6-hydroxy-5-methoxy-2-naphthoic acid, 2-chloro-4-hydroxybenzoic acid, 3-chloro-4-hydroxybenzoic acid, 2,3-dichloro-4-hydroxybenzoic acid, 3,5-dichloro-4-hydroxybenzoic acid, 2,5-dichloro-4-hydroxybenzoic acid, 3-bromo-4-hydroxybenzoic acid, 6-hydroxy-5-chloro-2-naphthoic acid, 6-hydroxy-7-chloro-2-naphthoic acid, and 6-hydroxy-5,7-dichloro-2-naphthoic acid.

Aromatic diol and its derivatives can be used as the aromatic diol compounds (c). The aromatic diol can include 4,4'-dihydroxydiphenyl, 3,3'-dihydroxydiphenyl, 4,4'-dihydroxytriphenyl, hydroquinone, resorcin, 2,6-naphthalenediol, 4,4'-dihydroxydiphenylether, bis(4-hydroxyphenoxy) ethane, 3,3'-dihydroxydiphenylether, 1,6-naphthalenediol, 2,2-bis(4-hydroxyphenyl)propane, and bis(4-hydroxyphenyl)methane. Aromatic diol derivatives have substituents such as alkyl, alkoxy, and halogen, and can include chlorohydroquinone, methylhydroquinone, t-buthylhydroquinone, phenylhydroquinone, methoxyhydroquinone, phenoxyhydroquinone, 4-chlororesorcin, and 4-methylresorcin.

Alicyclic diol and its derivatives can be used as the alicyclic diol compounds (c). The alicyclic diol can include trans-1,4-cyclohexanediol, cic-1,4-cyclohexanediol, trans-1,4-cyclohexanedimethanol, cic-1,4-cyclohexanedimethanol, trans-1,3-cyclohexanediol, cic-1,2-chclohexanediol, and trans-1,3-cyclohexanedimethanol. The alicyclic diol derivatives have substituents such as alkyl alkoxy, and halogen in the alicyclic diol, and can include trans-1,4-(2-methyl)cyclohexanediol and trans-1,4-(2-chloro)cyclohexanediol.

Aliphatic diol compounds (c) can include straight chain or branched aliphatic diols such as ethyleneglycol, 1,3-propanediol, 1,4-buthanediol, and neopentylglocol.

Aromatic dithiol compounds (d) can include benzene-1,4-dithiol, benzene-1,3-dithiol, 2,6-naphthalene-dithiol, and 2,7-naphthalene-dithiol.

Aromatic thiophenol compounds (d) can include 4-mercaptophenol, 3-mercaptophenol, and 6-mercaptophenol.

Aromatic thiol carboxylic acid compounds (d) can include 4-mercaptobenzoic acid, 3-mercaptobenzoic acid, 6-mercapto-2-naphthoic acid, and 7-mercapto-2-naphthoic acid.

Aromatic hydroxylamine compounds (e) can include 4-aminophenol, N-methyl-4-aminophenol, 3-aminophenol, 3-methyl-4-aminophenol, 2-chloro-4-aminophenol, 4-amino-1-naphthol, 4-amino-4'-hydroxydiphenyl, 4-amino-4'-hydroxydiphenylether, 4-amino-4'-hydroxydiphenylmethane, 4-amino-4'-hydroxydiphenylsulfide, and 4,4'-ethylenedianiline.

Aromatic diamine compounds (e) can include 1,4-phenylenediamine, N-methyl-1,4-phenylenediamine, N,N'-dimethyl-1,4-phenylenediamine, 4,4'-diaminophenylsulfide (thiodianiline), 4,4'-diaminodiphenlsulfone, 2,5-diaminotoluene, 4,4'-diaminodiphenoxyethane, 4,4'-diaminodiphenylmethane (methylenedianiline), and 4,4'-diaminodiphenyl ether (oxydianiline).

Thermotropic liquid crystal polyesteramide can include for example full aromatic polyesteramide. The full aromatic polyesteramide can include aromatic diamine, aromatic dicarboxylic acid, aromatic diol, aromatic aminocarboxylic acid, aromatic oxycarboxylic acid, aromatic oxyamino compounds, and their derivatives, and any combination of two or more of these.

Preferably the above thermotropic liquid crystal polymers is selected from full aromatic polyester and full aromatic polyester amide, because heat conducting polymer mold product which has superior heat conductivity can be readily available. More preferably, a full aromatic polyester is used.

Small amounts of another polymer can be added to the liquid crystal composition in order to improve heat resistance and workability. The polymer can include polyethylene terephthalate, polybuthylene terephthalate, polyethylene naphthalate, polyarylate, polyester carbonate, polycarbonate, polyimide, polyetherimide, polyamide, polyurethane, polyester elastomer, polystyrene, acrylic polymer, polysulfone, silicone polymer, halogen polymer, and olefin polymer.

In addition, if necessary, the liquid crystal composition can contain small amounts of pigment, dye, fluorescent bleach, dispersant, stabilizer, ultraviolet absorbent, energy quencher, antistatic additive, antioxidant, fire retardant, heat stabilizer, lubricant, elasticizer, and solvent.

Further, heat conductive filler can be appropriately added to the liquid crystal composition in order to improve heat conductivity of the heat conducting polymer mold products. The heat conductive filler can include metal, metal oxide, metal nitride, metal carbide, metal hydroxide, metal coated resin, carbon fiber, graphite carbon fiber, natural graphite, artificial graphite, spherical graphite grain, mesocarbon microbeads, whisker-shaped carbon, microcoil shaped carbon, nanocoil shaped carbon, carbon nanotube, and carbon nano horn. The examples of the metal are silver, copper, gold, platinum, and zircon; the examples of the metal oxides are aluminum oxides, magnesium oxides; examples of the metal nitrides are boron nitride, aluminum nitride, and silicon nitride; an example of the metal carbide is silicon carbide; and examples of the metal hydroxides are aluminum hydroxide and magnesium hydroxide. The blended amount of the heat conductive filler is preferably less than 100 parts by weight, more preferably 80 parts by weight, and further preferably 70 parts by weight with respect to the liquid crystal polymer 100 parts by weight. When the blended amount exceeds 100 parts by weight with respect to the liquid crystal polymer 100 parts by weight, the density of the heat conducting polymer mold is increased to prevent reducing the weight of the product.

When it is necessary to reduce weight of the product, heat conductive filler is not preferably contained in the liquid crystal composition. Preferably the amount of heat conductive filler with respect to the liquid crystal polymer 100 parts by weight is 5 parts by weight or less, more preferably 1 part by weight. Most preferably the liquid crystal composition does not contain heat conductive filler.

When lyotropic liquid crystal polymer is used as the liquid crystal polymer, a solvent is used for dissolving the lyotropic liquid crystal polymer. The solvent is not specifically limited if it is capable of dissolving the lyotropic liquid crystal polymer. It is preferable to select the heat solvent by considering dispersibility of the heat conductive filler, because the solvent also acts as dispersion medium. The amount of solvent used is selected so that lyotropic liquid crystal polymer exhibits liquid crystal state.

Figure 2:
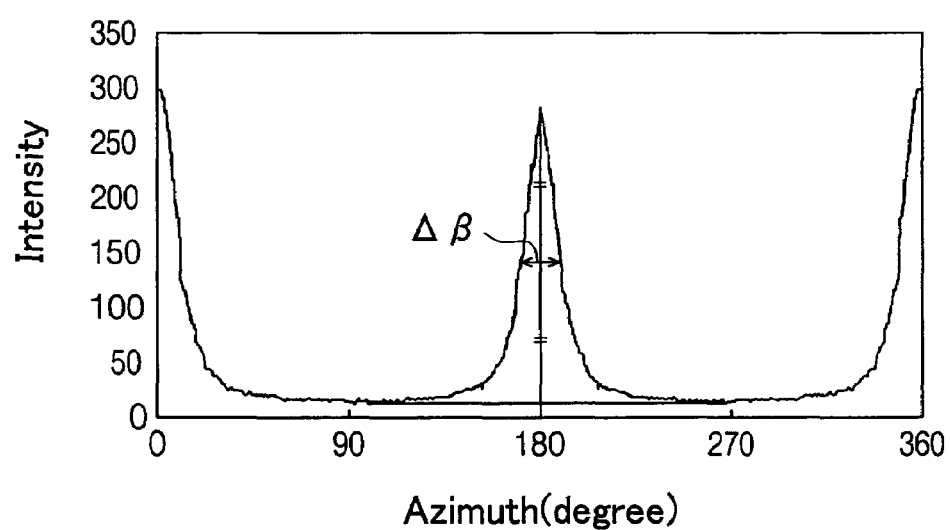
FIG. 2 is a graph showing the intensity distribution in the azimuth direction of heat conducting polymer mold product of Example 3.

The heat conductive polymer mold product is next described. The orientation degree α of the liquid crystal polymer in the heat conducting polymer mold product is obtained by wide-angle X-ray diffraction measurement of the heat conducting polymer mold product. In order to obtain the orientation degree α, an intensity distribution of diffraction in the equatorward direction as shown in FIG. 1 is obtained through wide-angle X-ray diffraction measurement. In the graph, a peak visible at diffraction angle 2θ=20 degrees represents the distance between liquid crystal polymer chains that are arranged in parallel in the polymer molding. The angle of this diffraction peak (peak scattering angle) is generally 20 degrees, and can fall in a range between 15 and 30 degrees in the vicinity of 20 degrees depending on the structure of the liquid crystal polymer and the blend of the liquid crystal composition. The intensity distribution in the azimuth direction can be obtained as shown in FIG. 2 when the angle of the diffraction peak (peak scattering angle) is fixed at 20 degrees and the azimuth is varied from 0 to 360 degrees to measure the intensity. The width (half width $\Delta\beta$) of the peak at the half of its height is obtained in this intensity distribution in the azimuth direction. The orientation degree $\alpha$ is calculated by substituting $\Delta\beta$ to equation (1). In the azimuth direction intensity distribution shown in FIG. 2, the orientation degree $\alpha$ is 0.83.

The orientation degree $\alpha$ is in a range between 0.5 and 0.1, preferably between 0.55 and 1.0, more preferably between 0.6 and 1.0, and most preferably between 0.7 and 1.0. Sufficient heat conductivity cannot be obtained when the orientation degree $\alpha$ is less than 0.5 because heat conductivity $\lambda$ is low. The orientation degree $\alpha$ will not be 1 or more in the equation (1) because the half width $\Delta\beta$ is always positive value. When the orientation degree $\alpha$ is in a range between 0.5 and 1.0, the heat conductivity $\lambda$ is high and can exhibit superior heat conductivity.

In order to obtain heat conductive polymer mold product from liquid crystal composition that contains thermotropic liquid crystal polymer, the thermotropic liquid crystal polymer is heat-melted in a mold and then the thermotropic liquid crystal polymer is oriented so that the orientation degree $\alpha$ is in a range between 0.5 and 1.0. The melted thermotropic liquid crystal polymer is next solidified by cooling in a state where the thermotropic liquid crystal polymer is oriented. The heat conducting polymer mold product having the orientation degree $\alpha$ of the above described range can be obtained by phase transfer from the liquid crystal state to solid state.

In order to obtain heat conducting polymer mold product from liquid crystal composition containing lyotropic liquid crystal polymer, the liquid crystal composition is molded in a mold, and the lyotropic liquid crystal polymer is oriented so that the orientation degree $\alpha$ is in a range between 0.5 and 1.0. The heat conducting polymer mold product having the orientation degree $\alpha$ of the above described range can be obtained by next removing solvent by volatization in a state where the lyotropic liquid crystal polymer is oriented to transfer the phase from liquid crystal state to the solid state.

The methods for orientating the liquid crystal polymer can include methods that use at least one of the fields selected from a group consisting of flow field, shear field, magnetic field, and electric field. A method using magnetic field is preferable among these orientation methods because the direction and degree of orientation are readily controllable. In order to orient liquid crystal polymer by using magnetic force, a magnetic field is applied to the liquid crystal polymer of liquid crystal state to orient the rigid molecular chain of the liquid crystal polymer in a parallel direction or a perpendicular direction to the line of magnetic force. The liquid crystal polymer is phase transferred next in a state where a magnetic field is applied from the liquid crystal state to the solid state. The orientation degree $\alpha$ of the liquid crystal polymer is set in a range between 0.5 and 1.0 in accordance with magnetic flux density of the magnetic field and the time period in which the magnetic field is applied.

A device for generating magnetic field can include permanent magnet, electromagnet, superconductor magnet, and coils. Among these magnetic field generating devices, the superconductor magnet is preferable because it is capable of generating a magnetic field, which generates practical magnetic flux density.

The magnetic flux density of the magnetic field applied to the liquid crystal polymer is preferably in a range between 1 and 20 tesla (T), more preferably between 2 and 20 T, and most preferably between 3 and 20 T. The rigid molecular chain of the liquid crystal polymer may not be sufficiently oriented when the magnetic flux density is less than 1 T, and a heat conducting polymer mold product having orientation degree $\alpha$ of 0.5 or more may not be obtained. On the other hand, it is not practical to readily obtain a magnetic field which has a magnetic flux density exceeding 20 T. When the magnetic flux density is in a range between 3 and 20 T, a heat conducting polymer mold product having high heat conductivity $\lambda$ can be obtained, furthermore, that range can be obtained in a practical manner.

Molds can be used that mold synthetic resin, such as molds for injection molding, extrusion molding, and press molding. The liquid crystal composition can be formed into a heat conducting polymer having various shapes such as sheet, film, block, grain, and fiber.

When the molecular chain of the liquid crystal polymer is oriented in a certain direction to set the degree of orientation degree $\alpha$ in a certain range, the heat conductivity $\lambda$ of the heat conducting polymer mold product can be significantly high in the direction of the longitudinal direction of the molecular chain. The heat conductivity $\lambda$ is preferably in a range between 0.7 and 20 W/(m·K), more preferably between 1.0 and 10 W/(m·K), and most preferably between 2.0 and 10 W/(m·K). When the heat conductivity $\lambda$ is less than 0.7 W/(m·K) it can be hard to conduct heat generated by the electronic component to the outside. On the other hand, it is hard to obtain heat conducting polymer mold product that has heat conductivity exceeding 20 W/(m·K) is hard in view of the physical property of the liquid crystal polymer.

The density of the heat conducting polymer mold product is preferably between 1.10 g/cm³ and 2.10 g/cm³, more preferably between 1.20 g/cm³ and 1.90 g/cm³, and most preferably between 1.30 g/cm³ and 1.80 g/cm³. The weight of the product cannot be reduced when the density is 2.10 g/cm³ or more. On the other hand, a heat conducting polymer molding having a density less than 1.10 g/cm³ is hard in view of the physical property of the liquid crystal polymer.

When forming the heat conducting polymer mold product into a sheet-shape, the thickness is preferably between 0.02 and 10 mm, more preferably between 0.1 and 7 mm, and most preferably between 0.2 and 5 mm. The operativeness at the time of applying it to the final product can be low if the thickness of less than 0.02 mm. On the other hand, the weight of the product, such as electronic components, cannot be reduced if the thickness exceeds 10 mm.

Figure 5:
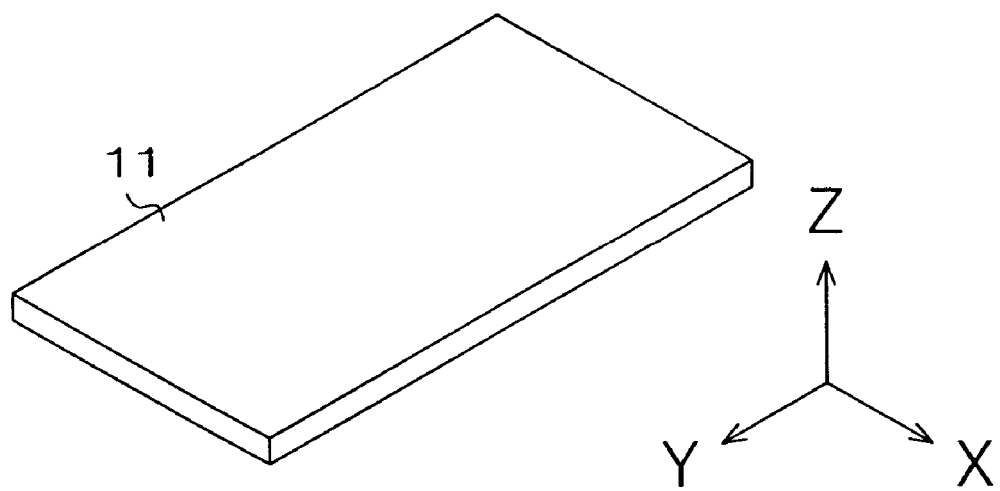
FIG. 5 is a perspective view showing heat conducting sheet according to an embodiment of the invention.
Figure 6:
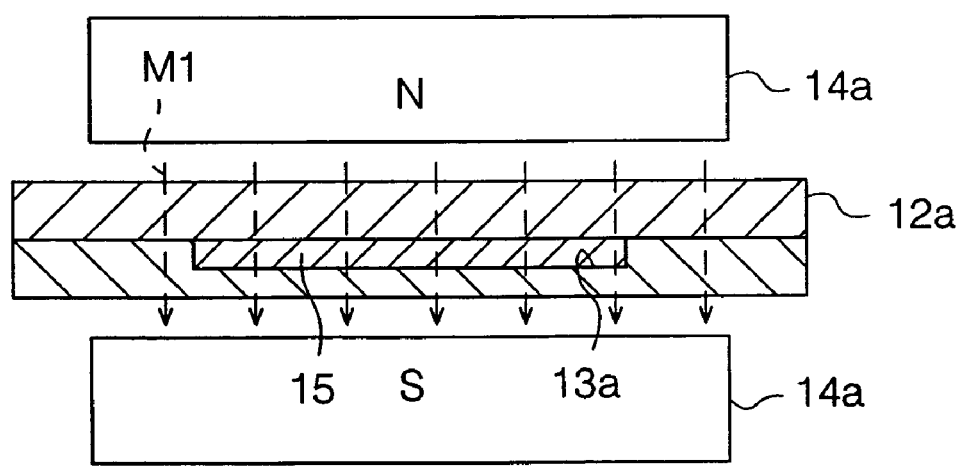
FIG. 6 schematically shows a method for producing a heat conducting sheet having high orientation degree in the direction of its thickness.
Figure 7:
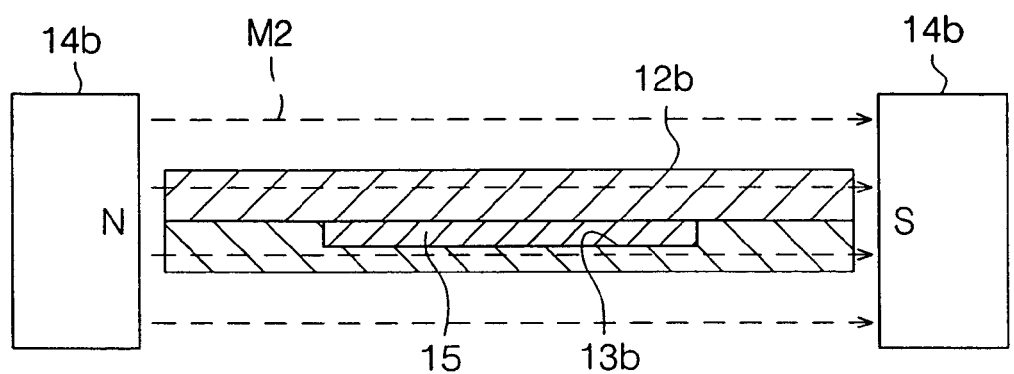
FIG. 7 schematically shows a method for producing a heat conducting sheet having a high orientation degree in the direction in the plane.

A method for producing heat conducting polymer molding from liquid crystal composition that uses thermotropic polymer is described by referring to FIGS. 5 to 7. As shown in FIG. 5, the sheet-shaped heat conducting sheet 11 can be used in electronic appliances as a heat releasing member, such as a substrate of a print wiring assembly or a heat releasing sheet. The sheet 11 is a heat conducting polymer mold product.

The method is described for orientating the rigid molecular chain of the thermotropic liquid crystal polymer in the direction of thickness (Z-axis direction in FIG. 5). As shown in FIG. 6, a cavity 14a is formed inside of the mold 12a into a shape corresponding to a shape of the sheet 11. A pair of permanent magnet 14a is disposed on and below the mold 12a as a device for generating magnetic field. The direction of the line of magnetic force M1 of the magnetic field generated by the permanent magnet 14a coincides with the direction of depth of the cavity 13a.

A liquid crystal composition 15 in which the thermotropic liquid crystal polymer is in a melted phase is filled into the cavity 13*a*. A heating apparatus not shown in the figures is disposed in the mold 12*a* to maintain the thermotropic liquid crystal polymer containing liquid crystal composition 15 filled in the cavity 13*a* is maintained in a melted state. A magnetic field having a certain magnetic reflux density is applied to the liquid crystal composition 15 by a permanent magnetic 14*a*. The line of magnetic force M1 is directed to the direction of thickness of the liquid crystal composition 15 so that the rigid molecular chain of the thermotropic liquid crystal polymer can be orientated into the thickness of the sheet-shaped liquid crystal composition 15. The thermotropic liquid crystal polymer is solidified by cooling under the orientated state, and is removed from the mold 12*a* so that the heat conducting sheet 11 can be obtained that has an orientation degree α of between 0.5 and 1.0 and in which the rigid molecular chain of the thermotropic liquid crystal polymer is orientated along the direction of its thickness can be obtained.

The orientation degree α of the liquid crystal polymer in the direction of thickness of the heat conducting sheet 11 is in a range between 0.5 and 1.0. Thus the heat conducting sheet 11 has a high heat conductivity λ along the direction of the thickness so that it can be used for a heat releasing sheet for circuit substrate material and a semiconductor package that requires heat conductivity of the thickness direction.

The method is next described for orientating the rigid molecular chain of the thermotropic liquid crystal polymer in a longitudinal direction parallel to a surface of the heat conducting sheet 11 (hereinafter referred to as "longitudinal direction"). As shown in FIG. 7, a pair of permanent magnets 14*b* is disposed to oppose each other on sides of the mold 12*b* so that the line of magnetic force M2 is parallel to the longitudinal direction. A magnetic field is then applied by the permanent magnets 14*b* to the liquid crystal composition 15. The rigid molecular chains of the thermotropic liquid crystal polymer can be directed to the longitudinal direction within the liquid crystal composition 15 because the line of magnetic force M2 is directed to the longitudinal direction of the sheet-shaped liquid crystal composition 15. A heat conducting sheet 11 in which the rigid molecular chains of the thermotropic liquid crystal polymer are directed to the longitudinal direction can be obtained after solidifying the thermotropic liquid crystal polymer under the orientated state by cooling and then removing from the mold 12*b*.

The orientation degree α within the longitudinal direction of the liquid crystal polymer of the heat conducting sheet 11 is in a range between 0.5 and 1.0. Accordingly, the heat conducting sheet 11 has a high heat conductivity λ in the longitudinal direction so that it can be used for a circuit substrate material or a heat releasing sheet of a semiconductor packaging assembly in which heat conductivity is required in the longitudinal direction.

The heat conducting polymer mold product of the embodiment is obtained from the liquid crystal composition that contains liquid crystal polymer and the orientation degree α of the liquid crystal polymer is in a range between 0.5 and 1.0. Accordingly, the head conducting polymer mold product has a high heat conductivity λ in the orientation direction of the liquid crystal polymer and can exhibit superior heat conductivity. The heat conductivity of the product can be further enhanced when the heat conductive filler is blended in the liquid crystal composition and set the orientation degree α of the liquid crystal polymer in the above described range. Therefore, superior heat conductivity can be obtained.

A heat conductive filler is preferably contained in an embodiment of the heat conducting polymer molding in an amount less than 100 parts by weight with respect to the liquid crystal polymer 100 parts by weight. In this case, the weight of the product can be reduced because the heat conductive filler is not contained at a high amount. The production process is simplified because any additional treatment such as those for dispersion of the heat conductive filler within the liquid crystal polymer can be omitted by using the reduced amount of heat conductive filler. In addition, since the liquid crystal composition comprises mainly of the liquid crystal polymer, the obtained heat conducting polymer mold product can exhibit the properties such as electric insulation of the liquid crystal polymer.

The liquid crystal polymer is preferably thermotropic liquid crystal polymer in the heat conducting polymer molding of one embodiment of the invention. In this case, the liquid crystal polymer can be easily orientated and a heat conducting polymer mold product can be readily obtained having superior heat conductivity.

In an embodiment of the invention the theromotropic liquid crystal polymer is preferably one selected from the group consisting of full aromatic polyesters and full aromatic polyesteramides. In this configuration, optical anisotropy can be easily obtained as well as the workability of the thermotropic liquid crystal polymer is good so that the molding can be formed in various shapes. Accordingly, the thermotropic liquid crystal polymer can be readily orientated and the liquid crystal composition can be easily formed so that a heat conducting polymer mold product can be easily obtained having good heat conductivity.

The orientation of the rigid molecular chain of the liquid crystal polymer can be controlled to a certain direction by applying a magnetic field to the liquid crystal polymer of the liquid crystal state in an embodiment of the heat conductive polymer mold product. The liquid crystal polymers can be readily orientated in this configuration so that a heat conducting polymer mold product can be readily obtained having superior heat conductivity.

It should be apparent to those skilled in the art that the present invention may be embodied in many other specific forms without departing from the spirit or scope of the invention. Particularly, it should be understood that the invention may be embodied in the following forms.

Any known filler such as glass fiber can be blended in place of the above described heat conductive fillers.

The permanent magnet 14*a*, 14*b* can be disposed only on one side of the mold 12*a* and 12*b* instead of placing the pair of magnets to sandwich the mold 12*a* and 12*b*.

The lines of the magnetic force M1 and M2 can be curved. The permanent magnets 14*a* and 14*b* are disposed so that the lines of magnetic force M1 and M2 extend in one direction in the above description. The permanent magnets 14*a* and 14*b* can be disposed so that the lines of magnetic force M1 and M2 extend in two or more directions. The lines of magnetic force M1 and M2 or the molding 12*a* and 12*b* can be rotated.

EXAMPLES

The embodiments of the invention are described in further detail by referring examples and comparative examples.

Example 1

A pellet of full aromatic polyester (i) comprising 80 mol % 4-hydroxybenzoic acid and 20 mol % mixture of terephthalic acid and ethyleneglycol was dehumified, and a sheet-shaped product having length 50 mm, width 50 mm, and thickness 2 mm was formed by extrusion molding. After melting the sheet-shaped product in a magnetic field with 2.5 tesla magnetic flux density generated by superconductor magnets and in a mold cavity heated to 340° C., it was held in the magnetic field for twenty minutes, and a heat conducting polymer molding was formed by solidification by cooling to the room temperature. The direction of the line of magnetic force was set to the thickness direction of the sheet-shaped mold product.

Examples 2 and 3

The heat conducting polymer mold products of Examples 2 and 3 were manufactured similar to Example 1 by using a sheet shaped mold product formed by extrusion molding of a pellet of the same full aromatic polyester (i) as Example 1 except that the magnetic flux densities were changed to those as described in table 1.

Example 4

A sheet-shaped mold product was manufactured similarly to Example 1 by using a full aromatic polyester (ii) comprising 60 mol % 4-hydroxybenzoic acid and 40 mol % mixture of (terephthalic acid and ethylene glycol) was used as the thermotropic liquid crystal polymer. By using the sheet-shaped mold product, the heat conducting polymer mold product was manufactured similarly to Example 1 except that the magnetic flux density was changed to 5 tesla.

Example 5

A sheet-shaped mold product was obtained similarly to Example 4. By using the sheet-shaped mold product, a heat conducting polymer mold product was manufactured similarly to Example 1 except that the magnetic flux density was changed to 10 tesla.

Comparative Example 1

A pellet of the same full aromatic polyester (i) as Example 1 was dehumidified and a sheet-shaped mold product having length 50 mm, width 50 mm, and thickness 2 mm was formed by extrusion molding. The sheet-shaped mold product was melted in the mold cavity heated to 340° C., held in meld state for 20 minutes, and then cooled to the room temperature to form the heat conducting polymer mold product by solidification.

Comparative Example 2

A sheet-shaped mold product was formed similarly to Comparative Example 1. After placing the sheet-shaped mold product in the mold cavity, heated to 340° C. and melted in a magnetic field of magnetic flux density 1 tesla, the melt state was held for 20 minutes and a heat conductive polymer mold product was formed through solidification by cooling it to the room temperature. The direction of the line of the magnetic force was set to the thickness of the sheet-shaped mold product.

Comparative Example 3

A sheet-shaped mold product was manufactured similarly to Example 4. By using the sheet-shaped mold product, heat conducting polymer mold product was manufactured similarly to the process of Comparative Example 2.

Figure 3:
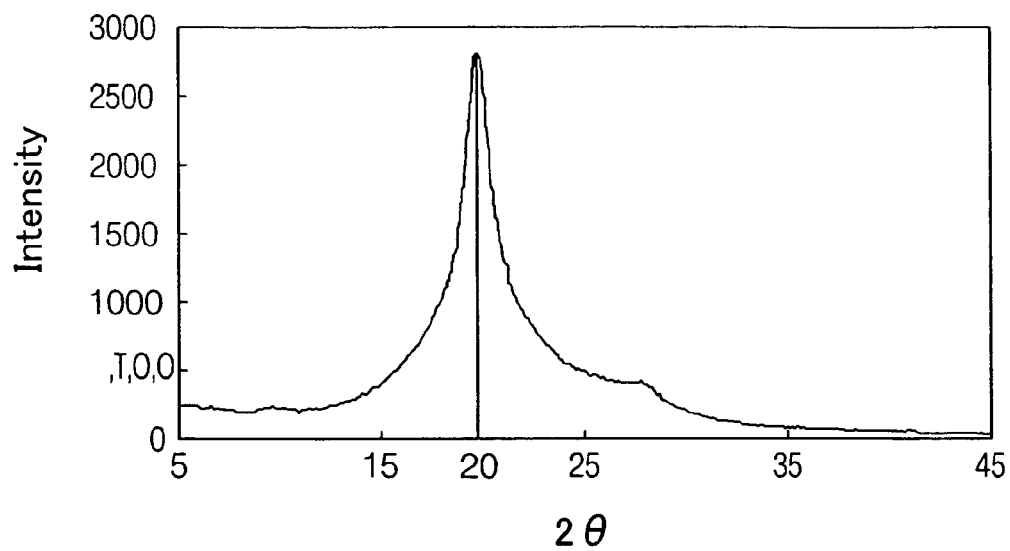
FIG. 3 is a graph showing the intensity distribution in the equatorward direction of conventional heat conducting polymer mold product (Comparative Example 1)
Figure 4:
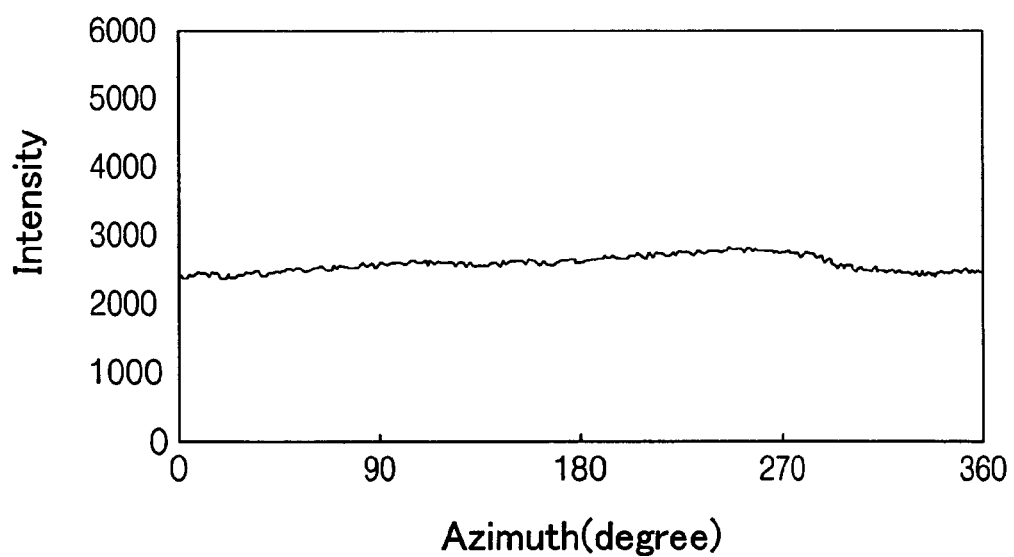
FIG. 4 is a graph showing the intensity distribution in the azimuth direction of conventional heat conducting polymer mold product (Comparative Example 1)

The orientation degree α of Examples 1 to 5 and Comparative Examples 1 to 3 were calculated by using an X-ray diffraction apparatus produced by MacScience. The intensity distribution in the equatorward direction obtained from X-ray diffraction measurement of Example 3 is shown in FIG. 1 and the intensity distribution in the azimuth direction at diffraction peak angle 2θ=20 degrees is shown in FIG. 2. The intensity distribution in the equatorward direction by X-ray diffraction measurement of Comparative Example 1 is shown in FIG. 3 and the intensity distribution in the azimuth direction at diffraction peak angle 2θ=20 degrees is shown in FIG. 4.

The heat conductivities λ of Examples 1 to 5 and Comparative Examples 1 to 3 are measured by laser flash method. The orientation degrees α and the heat conductivities λ of Examples 1 to 5 and Comparative Examples 1 to 3 are shown in table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Full aromatic polyester (i) [part by weight] | 100 | 100 | 100 | 0 | 0 | 100 | 100 | 0 |
| Full aromatic polyester (ii) [part by weight] | 0 | 0 | 0 | 100 | 100 | 0 | 0 | 100 |
| Magnetic flux density [tesla] | 2.5 | 5 | 10 | 5 | 10 | 0 | 1 | 1 |
| Orientation degree α | 0.71 | 0.83 | 0.91 | 0.81 | 0.90 | 0 | 0.41 | 0.40 |
| Heat conductivity λ [W/(m · K)] | 0.87 | 1.14 | 1.71 | 1.05 | 1.52 | 0.31 | 0.38 | 0.29 |

As shown in table 1, heat conducting polymer mold products having orientation degree α of 0.7 or more were obtained in Examples 1 to 5 and superior heat conductivity was obtained which exceeds 0.7 W/(m·K). It was proved from Examples 1 to 5 that heat conducting polymer mold products had higher orientation degree α as the magnetic flux density were set higher.

In Comparative Examples 1 to 3 on the other hand, the heat conducting polymer mold product had orientation degree α of less than 0.41, insufficient heat conductivity of less 0.38 W/(m·K) was obtained.

Example 6

A mixture in which 60 parts by weight carbon fiber grain (Petoca Materials Ltd.) was blended as a heat conductive filler to 100 part by weight full aromatic polyester (i). The full aromatic polyester (i) is the same polyester as Example 1 was melt mixed in an extruder and pellet-shaped liquid crystal composition was obtained. The liquid crystal composition was dehumidified and a sheet-shaped mold product of 50 mm length, 50 mm width, and 2 mm thickness was manufactured by extrusion molding. After placing the sheet-shaped mold body in a mold cavity heated to 340° C. and melted in a magnetic field of 5 tesla magnetic flux density generated by superconductor magnet, this state was kept for 20 minutes. A heat conducting polymer mold product was then manufactured through solidification by cooling to the room temperature. The direction of the line of magnetic force was set to the thickness of the sheet-shaped mold product.

Example 7

A heat conducting polymer mold product was similarly formed as Example 6 except the magnetic flux density was changed to 10 tesla.

Example 8

A mixture in which 50 parts by weight alumina powder (manufactured by Showa Denko) was blended as a heat conductive filler to 100 parts by weight full aromatic polyester (i) of the same type as Example 1 was melted and mixed in an extruder and pellet shaped liquid crystal composition was obtained. A heat conducting polymer mold product was manufactured from liquid crystal composition was manufactured similarly to Example 6 except that the magnetic flux density was changed to 10 tesla.

Example 9

A mixture in which 50 parts by weight graphite carbon fiber powder (manufactured by Petca Materials) was blended as a heat conductive filler to 100 parts by weight full aromatic polyester (ii) of the same type as Example 4 was melted and mixed in an extruder, and a pellet shaped liquid crystal composition was obtained. A heat conducting polymer mold product was manufactured from liquid crystal composition was manufactured similarly to Example 6 except that the magnetic flux density was changed to 10 tesla.

Comparative Example 4

A liquid crystal composition was obtained similarly to Example 6. The liquid crystal composition was dehumidified and a sheet-shaped mold product of 50 mm length, 50 mm width, and 2 mm thickness was manufactured by extrusion molding. The sheet-shaped mold product was placed in a mold cavity heated to 340° C., melted without applying magnetic field and the melt state was held for 20 minutes. A heat conducting polymer mold product was manufactured through solidification by cooling it to the room temperature.

Comparative Example 5

A liquid crystal composition was obtained similarly to Example 8. A heat conducting polymer mold product was manufacture from the liquid crystal composition similarly to Comparative Example 4.

Therefore, the present examples and embodiments are to be considered as illustrative and not restrictive and the invention is not to be limited to the details given herein, but may be modified within the scope and equivalence of the appended claims.

Comparative Example 6

A liquid crystal composition was obtained similarly to Example 9. A heat conducting polymer mold product was manufacture from the liquid crystal composition similarly to Comparative Example 4.

Orientation degree α and heat conductivity λ of Examples 6 to 9 and Comparative Examples 4 to 6 are shown in Table 2.

TABLE 2

|  | Example | | | | Comparative Example | | |
|---|---|---|---|---|---|---|---|
|  | 6 | 7 | 8 | 9 | 4 | 5 | 6 |
| Full aromatic polyester (i) [part by weight] | 100 | 100 | 100 | 0 | 100 | 100 | 0 |
| Full aromatic polyester (ii) [part by weight] | 0 | 0 | 0 | 100 | 0 | 0 | 100 |
| Carbon fiber powder | 60 | 60 | 0 | 60 | 60 | 0 | 60 |
| Alumina powder | 0 | 0 | 50 | 0 | 0 | 50 | 0 |
| Magnetic flux density [tesla] | 5 | 10 | 10 | 10 | 0 | 0 | 0 |
| Orientation degree α | 0.72 | 0.86 | 0.83 | 0.89 | 0 | 0 | 0 |
| Heat conductivity λ [W/(m · K)] | 1.96 | 3.16 | 1.14 | 3.02 | 0.43 | 0.38 | 0.40 |

As shown in Table 2, the heat conducting polymer molding having orientation a of 0.7 or more was obtained in Examples 6 to 9. Also, a high heat conductivity of 1.1 W/(m·K) or more was obtained because heat conductive filler is mixed.

On the other hand, the heat conducting polymer moldings of comparative examples 4 to 6 are conventional heat conducting polymer molding obtained from liquid crystal composition comprising thermotropic liquid crystal polymer and heat conductive filler. As shown in Table 2, only sufficient heat conductivity λ of less than 0.43 W/(m·K) was obtained when heat conductive filler was mixed at a small amount but the thermotropic liquid crystal polymer was not orientated.

What is claimed is:

1. A mold product comprising a liquid crystal composition for conducting heat, said liquid crystal composition containing liquid crystal polymer having an orientation degree α obtained by equation 1 below, Orientation degree α=(180−Δβ)/180    equation 1 in which Δβ is a half width in an intensity distribution obtained by fixing peak scattering angle in X-ray diffraction measurement and by varying the azimuth angle from 0 to 360 degrees;

wherein said orientation degree α is in a range between 0.5 and 1.0, and said liquid crystal composition contains heat conductive filler of less than 100 parts by weight with respect to 100 parts by weight said liquid crystal polymer.

2. A mold product comprising a liquid crystal composition for conducting heat, said liquid crystal composition containing liquid crystal polymer having an orientation degree α obtained by equation 1 below, Orientation degree α=(180−Δβ)/180    equation 1 in which Δβ is a half width in an intensity distribution obtained by fixing peak scattering angle in X-ray diffraction measurement and by varying the azimuth angle from 0 to 360 degrees;

wherein said orientation degree α is in a range between 0.5 and 1.0; and the liquid crystal polymer is an aromatic polyester containing 80 mol % 4-hydroxybenzoic acid and 20 mol % mixture of terephthalic acid and ethylene glycol, or the liquid crystal polymer is an aromatic polyester containing 60 mol % 4-hydroxybenzoic acid and 40 mol % mixture of terephthalic acid and ethylene glycol.

3. A mold product according to claim 1 wherein the liquid crystal polymer is a thermotropic liquid crystal polymer that exhibits melt phase having optical anisotropic property.

4. A mold product according to claim 3 wherein said thermotropic liquid crystal polymer comprises a polymer selected from a group consisting of full aromatic polyesters and full aromatic polyesteramides.

5. A mold product according to claim 1 wherein said liquid crystal polymers were provided with an orientation degree a by applying a magnetic force generated by a magnetic field generating device.

6. A mold product according to claim 1 wherein said mold product is formed into a sheet shape and the orientation degree α of the liquid crystal polymers at least in a direction of the thickness is in a range between 0.5 and 1.0.

7. A mold product according to claim 1 wherein a heat conductivity λ in at least one direction is in a range between 0.7 W/(m·K) and 20 W/(m·K).

8. A mold product according to claim 2 wherein the liquid crystal polymer is a thermotropic liquid crystal polymer that exhibits melt phase having optical anisotropic property.

9. A mold product according to claim 8 wherein said thermotropic liquid crystal polymer comprises a polymer selected from a group consisting of full aromatic polyesters and full aromatic polyesteramides.

10. A mold product according to claim 2 wherein said liquid crystal polymers were provided with an orientation degree α by applying a magnetic force generated by a magnetic field generating device.

11. A mold product according to claim 2 wherein said mold product is formed into a sheet shape and the orientation degree α of the liquid crystal polymers at least in a direction of the thickness is in a range between 0.5 and 1.0.

12. A mold product according to claim 2 wherein a heat conductivity λ in at least one direction is in a range between 0.7 W/(m·K) and 20 W/(m·K).

* * * * *